UNITED STATES PATENT OFFICE.

FREDERICK KOSKUL, OF PHILADELPHIA, PENNSYLVANIA.

IMPROVEMENT IN PROCESSES OF MANUFACTURING ARTIFICIAL STONE.

Specification forming part of Letters Patent No. 200,835, dated March 5, 1878; application filed April 27, 1877.

*To all whom it may concern:*

Be it known that I, FREDERICK KOSKUL, of the city of Philadelphia, State of Pennsylvania, have invented a certain new and useful Process in the Manufacture of Artificial Stone, of which the following is a specification:

This invention relates to that class of processes employed in manufacturing, from lime and other materials, an artificial stone to be used as a substitute for natural stone for paving, tiling, building, ornamental, and other similar purposes.

The materials employed in its composition are as follows, viz: No. 1, pulverized burnt lime; No. 2, burnt lime, slaked in a covered vessel with a solution of sulphate of iron, in the proportion of about ten parts of sulphate of iron to one hundred parts of water; No. 3, common earth, street-dust, stone-dust, brick-dust, and ashes, burnt and coarsely pulverized; No. 4, small pebble-stones and broken pieces of waste stone.

The process by which I combine these materials and convert them into artificial stone is as follows, viz: First, I take the pulverized burnt lime, (No. 1,) and mix it with water to the consistency of dough, in about the same manner that plaster is mixed, and place it in hot molds of any shapes desired, and made of any suitable material, iron or some other metal being best adapted for use. The molds are open at the top and bottom, and are placed on the heated top or plate of the stove or oven, which top or plate should also be of iron or metal. The composition, after it has been placed in the hot molds, while they lie on the stove or oven, is pressed smooth by a heated lid or cover, and in a few moments, by the action of the heat thus applied, the composition in the molds will have been hardened into a tolerably good stone. This may then be easily removed, and the molds, still hot, be refilled, and the composition be thus rapidly converted into properly-shaped blocks and hardened.

It will readily be seen that a large number of blocks may be made at one time by increasing the number of molds, and that, by putting the composition directly into the hot molds, which are always ready for use, a great saving of time and labor is accomplished, as the composition, when thus hardened, will not adhere to the molds, but may be easily removed and the molds replaced and refilled without delay. It will also be readily seen that by the action of a dry heat applied to the composition by this process, it will be hardened in a shorter time than by any known process.

Second, in order to produce a harder and more durable stone than the one which I have described, it is only necessary to apply the same process to a composition which includes the other materials I have named, properly combined. This composition is made as follows, viz: I take the pulverized burnt lime, (No. 1,) and, instead of water, use for mixing it a solution about equal in thickness to milk made by No. 2, slaking the burnt limestone in a covered vessel with a solution of sulphate of iron, in the proportion of about ten parts of sulphate of iron to one hundred parts of water, and then add No. 3, (common earth, street-dust, stone-dust, brick-dust, and ashes, or some of them,) burnt and coarsely pulverized. The sulphate of iron and the burnt earth, dust, or ashes are used to increase the hardness of the stone and render it impervious to water. This mixture is worked to about the consistency of dough, and placed in the hot molds, according to the process above fully described, and in a few moments, by the action of the heat thus applied, will be converted into a very hard and durable stone.

When blocks of more than three inches in thickness are required, I add No. 4 (small pebble-stones or broken pieces of waste stone,) which conducts the heat rapidly to the center of the composition, and causes it to harden equally in all parts.

What I claim, and desire to secure by Letters Patent, is—

The process of hardening a composition of lime or other substances by hot molds, substantially for the purposes and in the manner herein described.

FREDERICK KOSKUL.

Witnesses:
WM. C. GROSS,
JOHN R. QUIN.